United States Patent Office 3,822,140
Patented July 2, 1974

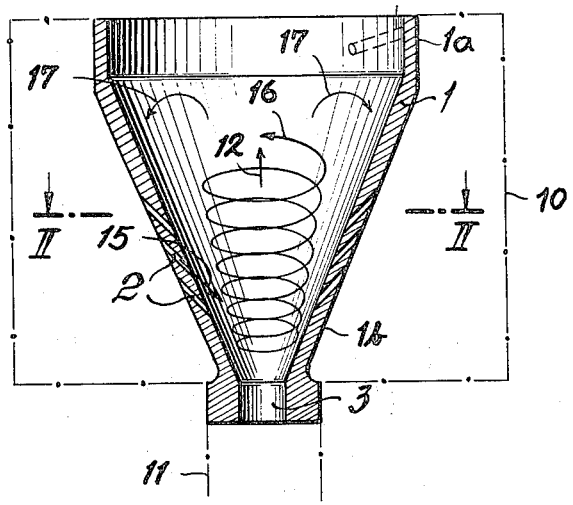
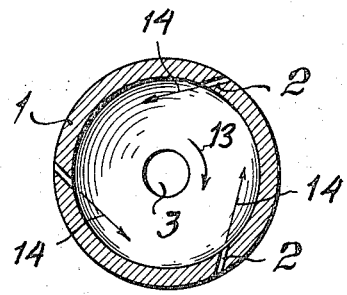
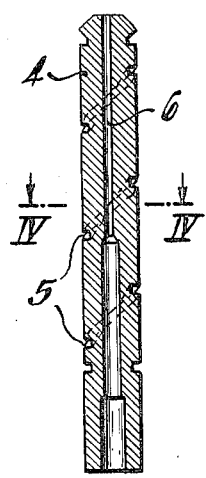
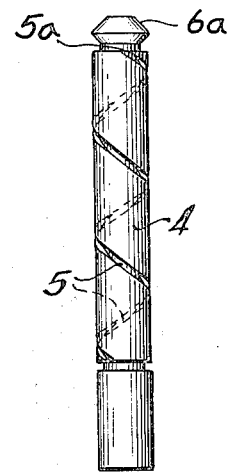

---

3,822,140
METHOD OF AND APPARATUS FOR THE PRODUCTION OF COATED-PARTICLE FUEL FOR NUCLEAR REACTORS
Erno Gyarmati and Hubertus Nickel, Julich, and Carl-Friedrich Wallroth, Laurensberg, Germany, assignors to Kernforschungsanlage Julich Gesellschaft mit beschrankter Haftung, Julich, Germany
Filed Dec. 20, 1971, Ser. No. 210,080
Claims priority, application Germany, Dec. 19, 1970,
P 20 62 794.5
Int. Cl. B44d 1/02
U.S. Cl. 117—46 CG                                   7 Claims

ABSTRACT OF THE DISCLOSURE

A method and apparatus for coating nuclear fuel particles in a fluidized bed with carbon deposited from a pyrolytically decomposable gas. The static layers in the fluidized bed coating system are broken up by generating a vortex or twisting displacement of the fluidized bed about its axis in a divergent conical fluidized bed chamber. Carrier gas is introduced axially into the bottom of the chamber and downwardly and tangentially through openings in the wall of the fluidized bed chamber. The tangentially and helical movement imparted to the gases in the chamber results in an improved coating uniformity on the particles.

---

CROSS REFERENCE TO COPENDING APPLICATION

This application is based in part on the subject matter of the commonly owned copending application Ser. No. 876,494 filed Nov. 13, 1969, now U.S. Pat. No. 3,634,710, and entitled Nozzle Structure for the Coating of Particles in a Fluid Bed.

FIELD OF THE INVENTION

Our present invention relates to a method of and an apparatus for the coating of articles with substances entrained or generated in a gas stream and, more particularly, to a system for coating nuclear-fuel particles for use in a nuclear reactor.

BACKGROUND OF THE INVENTION

In the aforementioned application and elsewhere, there have been described systems for the coating of nuclear fuel particles and particles of fertile substances for use in nuclear reactors. In fact, coated-particle technology is of growing interest in the reactor field and various methods have been suggested for producing the particle coatings. Reference is made in this connection to the article entitled "Ceramic-Coated-Particle Nuclear Fuels" appearing in the January 1964 issue of the Journal of Nuclear Materials, Volume 11, pages 1–31 (1964).

More generally speaking, nuclear particles, i.e. particles of nuclear fuel or fertile material for use in the core of a nuclear reactor, of a particle size between 100 and 1000 microns, are formed in a fluidized bed, furnace or chamber in which a carrier gas such as argon produces a vortex or fluid bed in which the particles circulate as pyrolytically deposited carbon builds up on the cores of fissionable or fertile materials. The carbon may derive from the pyrolytic decomposition of hydrocarbons introduced into the furnace. Other coating material can likewise be deposited upon the particles by appropriate choice of the pyrolytically decomposable compounds.

Coated nuclear-fuel particles of this type find use especially in gas-cooled high-temperature reactors. The pyrolytic reaction is generally carried out at a temperature between 1000° and 2100° C. and produces a sheath of mechanically and thermally resistant material which is capable of withstanding the high temperatures of the nuclear-reactor core, which is impenetrable by the gaseous and solid fission products generated within the reactor particle, and which is capable of resisting mechanical stress and abrasion. Since a ball-shaped or spheroidal sheath of uniform wall thickness provides the highest strength, it is desirable that the coating process be as uniform as possible so as to yield spheroids of a wall thickness which is constant or substantially constant.

It has been suggested, as noted above, that uniformity of coating can be increased by carrying out the coating process in a specially shaped fluid-bed reactor, namely, a reactor having an upwardly divergent frustoconical chamber and a pair of coaxial tubes into which the gases are introduced (see the above-mentioned copending application). The conventional fluid-bed coating apparatus has a fluid-injection assembly arranged to inject process gas, i.e. a gas capable of pyrolytically decomposing to form the coating material, and fluidizing fluid into the vessel via separate coaxial orifices. The assembly is so constructed as to provide two annular injection orifices for the fluidizing fluid to spread the latter over the wall of the vessel and over the process-gas injection orifice. In the improvements described in the aforementioned application, however, the nozzle is composed of graphite and the pyrolysis gas is introduced centrally while the carrier gas is introduced over the periphery.

In all of the aforementioned systems, there has been detected a coating problem which appears to result from a non-uniform migration of the particles over the entire fluidized bed chamber. In fact, the particles appear to move in static axial planes with a vortex pattern so that the coating material eventually builds up in flattened layers rather than a uniform spheroidal shell. In fact, the particles are carried upwardly from a narrow portion of the chamber to a wide portion, pass radially from an ascending zone to a descending zone, move downwardly in the descending zone and again move into an ascending stream. The location of the plane of the vortex scarcely changes and such static layers are common. Furthermore, many particles remain at the periphery of the fluid bed while others remain generally centrally. Between the center and the periphery, the coating rate falls sharply. Thus some particles are coated more rapidly than others while some particles are coated over certain portions of their surface and others are coated over substantially all of the surface. A significant disadvantage is that the fuel particles, because of their practically unchanging location with respect to the axis of the fluid bed, are coated nonuniformly and are provided with sheaths of varying wall thickness. The nature of the coating likewise has depended in the past on the location of the vortex or movement pattern of the individual particle in the fluid bed.

In summary, the prior-art coating systems, while eventually producing a sheath over the entire nuclear fuel particle, are capable of producing only a small proportion of truly spherical and uniform coatings. Most of the coatings are of nonuniform wall thickness and are of varying degrees of irregularity. As a consequence, the mechanical strength of the particles may be below that which is required.

OBJECTS OF THE INVENTION

An object of our invention is to provide a fluid-bed coating system for the production of coated-particle nuclear fuels and fertile bodies for use in a nuclear reaction whereby the uniformity of coating is increased and the spheroidal ideal more closely approached.

Still another object of the invention is to provide a method of coating nuclear fuel and other cores with pyrolytically produced carbonaceous material in a fluidized bed in which slip layers of poor-coating stratification of the bed does not occur.

It is also an object of the invention to provide an improved apparatus for the production of coated-particle nuclear fuels and the like whereby the aforementioned disadvantages are obviated.

SUMMARY OF THE INVENTION

These objects are attained in accordance with the present invention, in a fluid-bed coating system of the general type described wherein, however, the static layers within the bed are broken up and a more uniform turbulence is created therein.

We have found that we are able to effect this destruction of the static layers by imparting an additional component to the movement of the particles in the bed, i.e. by generating a vortex or twisting displacement of the entire fluidized bed about its axis. This is achieved by imparting a spiral motion to the carrier gas as it is introduced into the fluid bed or by admitting gas tangentially into the fluid bed at a location above that at which the carrier gas is introduced.

According to an important feature of the invention, the fluidized-bed chamber is provided with a generally cylindrical upper portion and a generally conical lower portion diverging upwardly to the cylindrical upper portion, the apex of the lower portion being provided with inlet means, preferably coaxial ducts, for introducing the carrier gas and the pyrolysis gases as previously described. The angular component of movement of the fluid bed can thus be generated by introducing a gas tangentially into the conical lower portion and/or the cylindrical upper portion of the reaction tube and/or by introducing one of the gases through the coaxial nozzles with an angular component. Furthermore, we prefer to introduce the gas with a vertical component of movement as well. Thus the inlet-slot ports or apertures in the cylindrical or conical wall of the reactor tube and the inlets of the coaxial nozzle may open into the fluid bed with a downward inclination as well as a generally tangential orientation.

This arrangement results in an increased circulation of the particles and a breakup or displacement of any slip or static layers which may develop within the fluid bed. Furthermore, the residence time in the central coating zone is increased and the particles are more rapidly coated. It should be noted that efforts to achieve a similar effect by directing gases inwardly through the wall of the conical portion of the reaction tube have proved unsatisfactory with respect to increased uniformity and speed of coating.

The vortex movement about the upright axis of the reaction tube can be augmented, as noted earlier, when the carrier gas is introduced with an angular component of velocity from the nozzle at the base of the reaction cone. We have found it to be highly advantageous to provide a plurality of generally helical (spiral) supply channels for the carrier gas which open around the inlet for the process gas adapted to be pyrolytically decomposed to produce the coating carbon. When tangential openings in the wall of the reaction tube are used together with a spiral infeed, the angular sense of the nozzle component may differ from or be the same as the angular sense of the tangential component. In the first case, the turbulent disruption of any slip layers within the fluidized-bed chamber is increased while in the other case the slip layers are displaced at high velocity so as to improve the uniformity of coating in both instances.

DESCRIPTION OF THE DRAWING

The above and other objects, features and advantages of the present invention will become more readily apparent from the following description, reference being made to the accompanying drawing in which:

FIG. 1 is a vertical cross-sectional view through a conical portion of the reaction tube, according to the present invention;

FIG. 2 is a cross-sectional view taken along the line II–II of FIG. 1;

FIG. 3 is an axial cross-sectional view through a nozzle adapted to be used in the assembly of FIG. 1;

FIG. 4 is a cross-sectional view taken along the line IV–IV of the nozzle; and

FIG. 5 is an elevational view of the nozzle showing only one of the numerous helical channels formed in the periphery of the nozzle.

SPECIFIC DESCRIPTION

In FIGS. 1 and 2 of the drawing, we have shown a fluidized-bed reactor tube 1 having a cylindrical upper portion 1a which is provided with tangential downwardly trained bores 2a, above the conical portion 1b which is formed with numerous sets of angularly spaced tangential bores 2, several sets of such bores being oriented above one another as is best seen in FIG. 1. The bores 2 and 2a may be supplied with additional carrier gas by a manifold represented at 10 in dot-dash lines. At its base, the cone 1b is provided with an axial bore 3 into which the nozzle 4 may be fitted. The nozzle 4 is formed with a central bore 6 through which the process gas may be introduced. Along the periphery of the nozzle, there are provided helical channels 5 which open at the neck 5a below inlet 6a for the process gas. Consequently, when carrier gas is introduced via duct 11 around the nozzle 4 and the latter is inserted in bore 3 so that only the port 6a extends above the bore 3, a vertical component of movement of the incoming gases in the direction of arrow 12 is produced in the cone 1b. At the same time, the carrier gas receives a spiral or angular component of velocity in the clockwise sense, as represented by the arrow 13, while a tangential component of velocity is provided as represented in 14 in the counterclockwise sense. Furthermore, the carrier gas introduced through the walls of the reactor tube 1 has a downward component as represented at 15. Hence the gases tend to spiral upwardly as generally represented at 16, pass outwardly as represented at 17 and descend in a spiral of the opposite sense to create the usual fluidized-bed movement in addition to a rotation and turbulent mixing of all layers or starta of the gas.

In general, the apparatus of FIGS. 1–5 can be operated as described in the commonly assigned copending application mentioned earlier.

SPECIFIC EXAMPLE

As described in the above-mentioned copending application and the references therein cited, uranium-oxide particles are coated with pyrolytic carbon, using as a carbon source chloromethylsilane mixed with methyl at a temperature of about 1900° C. The carrier gas is argon and coatings are applied to a thickness of about 300 microns so that the coated particles have an overall thickness of about 1000 microns. Since the sphericity and the polyhedral characteristics of the particle are measures of the uniformity of coating because greater polyhedral character represents a reduced sphericity, the percent of the particles which are generally polyhedral rather than sperical is an indication of the uniformity of the process. When the coating is carried out under the conditions specified above but in the apparatus illustrated in FIGS. 1–5 without spiral infeed of the carrier gas and without tangential infeed of the carrier gas through the wall of the reaction tube, the proportion of particles of a polyhedral character is 15.4%, the carrier gas being, of course, introduced axially.

When, however, the gas is tangentially introduced through openings 2 and additional carrier gas is fed spirally into the reactor via a helical channel 5, the polyhedricity is reduced to 7.9%. With either the tangential inflow or the spiral inflow of gas alone, a percentage between 7.9 and 15.4 is obtained.

In the foregoing description we have repeatedly referred to the carrier fluid and the fluid containing the coating material. Of course both of these fluids are gases and the application test should be so understood. Similarly, we have used the terms fluidized bed and fluid bed variously throughout the application, as they have been used in the art, although they both define a single concept.

We claim:

1. A method of producing coated particles for use in a nuclear reactor, comprising the steps of entraining a fluidized bed of particles in vortex movement by injecting a carrier gas and a pyrolytically decomposable gas axially into the apex of an upwardly divergent conical fluidized bed chamber, pyrolytically decomposing the pyrolytically decomposable gas containing coating material in said fluidized bed to deposit said material on said particles; and imparting an angular component of movement to at least a portion of said fluidized bed by introducing carrier gas downwardly and tangentially through a wall of said chamber.

2. The method defined in Claim 1 wherein said angular component of movement of said portion of said fluidized bed is also generated in part by feeding a gas generally tangentially into said fluidized bed at the apex of said chamber.

3. The method defined in Claim 1 wherein said angular component is in part produced by feeding said carrier gas axially into said fluidized bed at the apex of said conical chamber with a spiral motion.

4. The method defined in Claim 1 wherein said component is in part produced by introducing said carrier gas centrally into said bed with a spiral motion.

5. The method defined in Claim 4 wherein said spiral motion of said carrier gas is produced by directing the carrier gas along a plurality of helices surrounding the axis of said chamber and moving in the direction of said bed.

6. An apparatus for coating particles for use in a nuclear reactor, comprising an upwardly widening generally conical reaction chamber adapted to maintaining a fluidized bed for coating particles with a pyrolytically deposited substance; means for introducing a gas containing said substance axially into the bottom of said chamber; means for introducing carrier gas into said chamber to suspend said particles in said bed; and means for rotating said bed to prevent the formation of static zones therein, the last mentioned means including a plurality of openings formed in a wall of said chamber and trained generally tangentially and downwardly for injecting additional carrier gas into said chamber with a tangential component of movement.

7. The apparatus defined in Claim 6, further comprising a nozzle opening axially into said chamber at the apex thereof and formed with a plurality of generally helical channels opening into said chamber for producing a spiral flow of gas therein.

References Cited
UNITED STATES PATENTS

| | | | |
|---|---|---|---|
| 3,251,337 | 5/1966 | Latta et al. | 117—100 |
| 3,566,830 | 3/1971 | Flamm | 118—308 |
| 3,163,362 | 12/1964 | McFee | 239—405 |
| 1,547,349 | 7/1925 | Reichenbach | 239—405 |
| 239,630 | 4/1881 | Walter | 239—405 |

WILLIAM D. MARTIN, Primary Examiner

D. C. KONOPACKI, Assistant Examiner

U.S. Cl. X.R.

117—100 B, Dig. 6; 118—303, Dig. 5; 239—405